US005954187A

United States Patent [19]
Hager

[11] Patent Number: 5,954,187
[45] Date of Patent: Sep. 21, 1999

[54] CONVEYOR ROD IN SIDE LINK CONNECTION

[75] Inventor: Michael L. Hager, Mardela Springs, Md.

[73] Assignee: Cambridge, Inc., Cambridge, Md.

[21] Appl. No.: 08/785,935

[22] Filed: Jan. 22, 1997

Related U.S. Application Data

[60] Provisional application No. 60/010,385, Jan. 22, 1996.
[51] Int. Cl.[6] ................................................. B65G 13/02
[52] U.S. Cl. ........................... 198/778; 198/852; 198/853
[58] Field of Search .................................... 198/778, 852, 198/853

[56] References Cited

U.S. PATENT DOCUMENTS

| 2,126,274 | 8/1938 | Noffsinger et al. | 198/853 |
|---|---|---|---|
| 3,348,659 | 10/1967 | Roinestad . | |
| 4,078,655 | 3/1978 | Roinestad | 198/848 |
| 4,603,776 | 8/1986 | Olsson | 198/778 |
| 4,953,693 | 9/1990 | Draebel | 198/853 |
| 5,137,141 | 8/1992 | Irwin | 198/778 |
| 5,350,056 | 9/1994 | Hager . | |
| 5,501,319 | 3/1996 | Larson et al. | 198/778 |
| 5,566,817 | 10/1996 | Meeker | 198/848 |

FOREIGN PATENT DOCUMENTS 488702  6/1992  European Pat. Off. .

Primary Examiner—Johnny D. Cherry
Assistant Examiner—Steven B. McAllister
Attorney, Agent, or Firm—Burns, Doane, Swecker & Mathis, L.L.P.

[57] ABSTRACT

A conveyor belt having a drive mechanism and specifically rod and side link connections in the belt. The belt includes a plurality of pivotal link members by which the belt can collapse or extend along a side edge to follow a curved path. One end of each of the link members along the edge of the belt that engages the drive mechanism is formed into a hook-shape. The belt also includes a plurality of transverse rod members. At least one end of each rod is headless and is captured within the hook-shaped end of a link member. This results in the hook-shaped end of the link member engaging the drive mechanism, with the rod end being secured to the link member within the hook-shaped end of the link.

20 Claims, 4 Drawing Sheets

CONVEYOR ROD IN SIDE LINK CONNECTION

This application claims priority from U.S. Provisional Application No. 60/010,385 filed Jan. 22, 1996.

BACKGROUND OF THE INVENTION

1. Field of the Invention

The present invention relates to conveyor belts having a drive mechanism, such as belts that travel on a straight path, around turns or on along a helical track, and specifically concerns the conveyor rods and side link connections in such conveyor belts.

2. Description of the Related Art

It is known to use a conveyor belt in high volume production operations performed in a relatively small space where the conveyor belt moves in an upward or downward spiral path. It is also known that certain of such conveyor belts include a plurality of interconnected pivotal link members which allow the belt to follow a curved path or traverse a sprocket in either an upward or downward direction when following the straight-line path; and a plurality of transverse rod members of an overlying belt tier, the rod members having ends with enlarged heads. Additionally, it is known to secure said link members to the transverse rod members by passing the rod through the link member and fastening the enlarged head of the rod member to the outside of the link member such that the rod head protrudes outside of the link.

A known conveyor system of this type is disclosed in U.S. Pat. No. 3,348,659 to Roinestad. In this system the belt is frictionally driven along the inside edge by an upright drum with a peripheral driving surface. A series of vertical driving bars are positioned around the periphery of the drum at circumferentially spaced locations and engage in a frictional driving relationship with the inner edge of the belt. The belt may comprise a plurality of transverse rods which interconnect a plurality of a U-shaped link members wherein such link members slidably nest within each other and enable the belt to be collapsed along either edge. The link members are slotted to receive the rods. At the extreme outer edge of each of the rods outside of the link members, there is an arcuate dome-shaped protrusion which may be formed by a welding operation to secure the ends of the rods with respect to the link members. In this system, the head of the rod extends through the link and is welded to the outside of one end of the link. It is the frictional driving engagement between the vertical driving bars and the arcuate protrusions which provide the primary drive for the belt.

Another known conveyor system is described in U.S. Pat. No. 5,350,056 to Hager. In this system, the conveyor belt is self-supporting with a portion of the belt following a helical conveying path comprising a plurality of stacked tiers. The belt includes a plurality of interconnected pivotal link members by which the belt can either collapse or extend along a side edge thereof to follow a curved path; and a plurality of transverse rod members of an overlying belt tier. Secured to the link members are wire formed spacers which extend between adjacent belt tiers. One embodiment of the system includes rods formed with an enlarged head which are received through slots in the link members and secured to the outside of the end of the link member by, e.g., welding, so that the rod heads protrude on the outside of the ends of the link members.

One method of securing the transverse rods with enlarged heads to the link members is by buttonhead or upset welding the head to the outside of one end of the link member. In this type of welding, the buttonhead weld is cold formed and then a plasma type weld affixes the rod to the outside of the link.

Although the self-supporting spiral conveyor belt disclosed in the 5,350,056 patent represents a significant advance in the art, there remains room in the art for improvement, particularly with respect to the manner in which the rods are secured to the link members, wherein the rod heads protrude and are welded to the outside of one end of the link members. One of the areas for improvement arises because the conventional buttonhead type welding can result in a driven surface that will, over time, abrade the portions of the drive mechanism which engages the belt; if such portions of the drive mechanism are plastic, such abrasion can cause plastic fires that contaminate the portions. This is because current systems which use button-welded links with welds can develop burrs or uneven projections on the edge of the belt that engages the driving mechanism.

Further, welding the links to the connecting rod under current designs requires considerable care because the weld on the outside of the link, e.g., the plasma weld, must be accurately placed, of sufficient size/cross-section, but yet it must not extend out past the buttonhead weld. The outside edge of the belt should be uniform, and free of sharp or uneven projections or else it could create drive problems between the belt edge and the portion of the drive mechanism that engages the belt. Thus, it is desirable to obtain a sufficiently strong weld without interfering with the extreme outside edge of the belt. Also, buttonhead type welding is a relatively expensive operation and inserts extra steps into the production process.

Accordingly, there is a need in the art for a conveyor belt which improves upon current conveyor belt designs.

SUMMARY OF THE INVENTION

The present invention provides a conveyor belt having a drive mechanism that includes a plurality of interconnected pivotal link members which allow the belt to follow a straight or curved path, or traverse a sprocket in either an upward or downward direction when following the straight-line path. One end of each of the link members along the edge of the belt that engages the drive mechanism is formed into a hook shape. The belt also includes a plurality of transverse rod members, such as of an overlying belt tier. At least one end of each rod is headless and is captured within the hook-shaped end of a link member. The rods are secured to the link members by affixing, such as by means of a weld, the headless ends of the rods within the hook-shaped ends of link members. This results in the outside portion of the hook-shaped end of the link member engaging the drive mechanism, with the rod end being secured to the link member within the hook-shaped end of the link and not protruding outside of the link.

A preferred embodiment of the present invention provides a self-supporting conveyor belt, a portion of the length of which follows a helical conveyor path, comprising a plurality of stacked tiers like that of U.S. Pat. No. 5,350,056. The disclosure of U.S. Pat. No. 5,350,056 is incorporated fully herein by reference. In this embodiment, the belt includes a plurality of interconnected pivotal link members to allow the belt to follow a curved path or traverse a sprocket. Secured to the link members are wire-formed spacers which extend between adjacent belt tiers, the wire-formed spacers of one tier abutting and supporting an immediately overlying tier.

Further, in this embodiment, the link members of the belt are generally U-shaped (as the links are formed in U.S. Pat. No. 5,350,056) with the addition of one end of the link being formed into a hook-shape. The belt also includes a plurality of transverse rod members of an overlying belt tier, at least one end of the rods being headless. The rod members are received in apertures or holes in the ends of the link, the headless end of the rod resting within the hook-shaped end of the link. The rod is secured within the hook-shaped end of the link, for example, by means of a weld. The hook-shaped end of the link forms a projection which contacts the drive mechanism. The outer surface of the hook-shaped end which contacts the drive mechanism, such as a vertical drive bar, may be beveled to present a smooth edge to the drive mechanism.

Although the above preferred embodiment is described in terms of a stacked, spiral track type belt, one of ordinary skill in the art would, of course, recognize that the invention applies generally to conveyor belts having drive mechanisms, such as belts that travel on a straight path, around turns, or that travel on a helical track.

In an alternative embodiment, a cap may cover the projection formed by the hook-shaped end of the link.

In an additional embodiment, portions of the drive mechanism, such as a vertical drive bar, would contain projecting ribs to engage the protrusion formed by the hook-shaped end of the link. Another variation of the invention would employ ribs projecting from the outer surface of the hook-shaped end of the link to engage the drive mechanism, so as to improve drive friction between the belt edge and the drive mechanism.

BRIEF DESCRIPTION OF THE DRAWINGS

The conveyor belt of the present invention is exemplified in the following description; making reference to the accompanying drawings, wherein.

DETAILED DESCRIPTION OF THE PREFERRED EMBODIMENTS

Figure 1A:
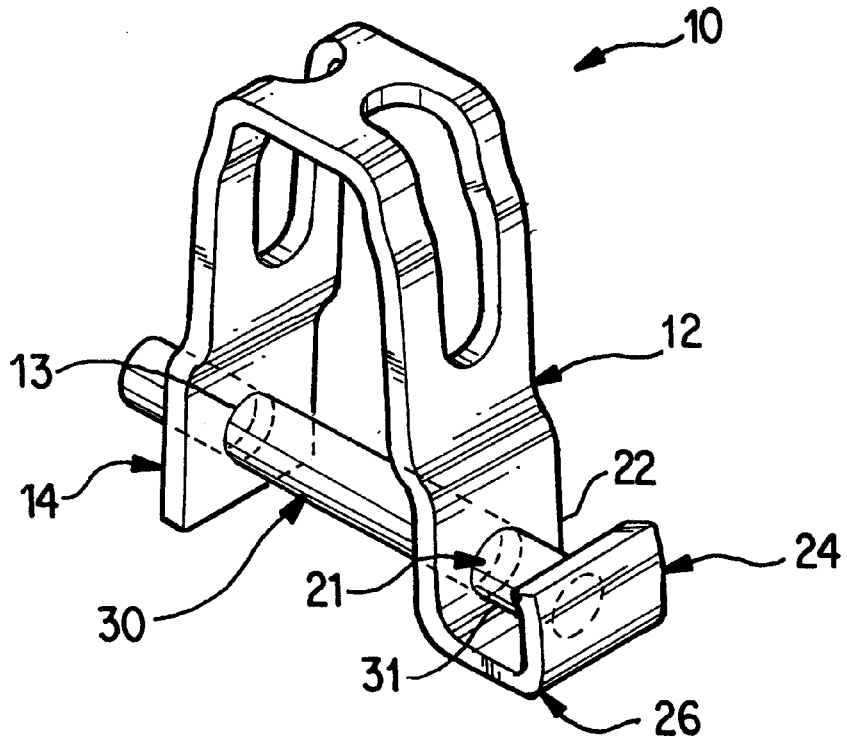
FIG. 1A is a perspective view of the link showing the transverse conveyer rod resting within the hook-shaped end of the link in accordance with the invention.
Figure 1B:
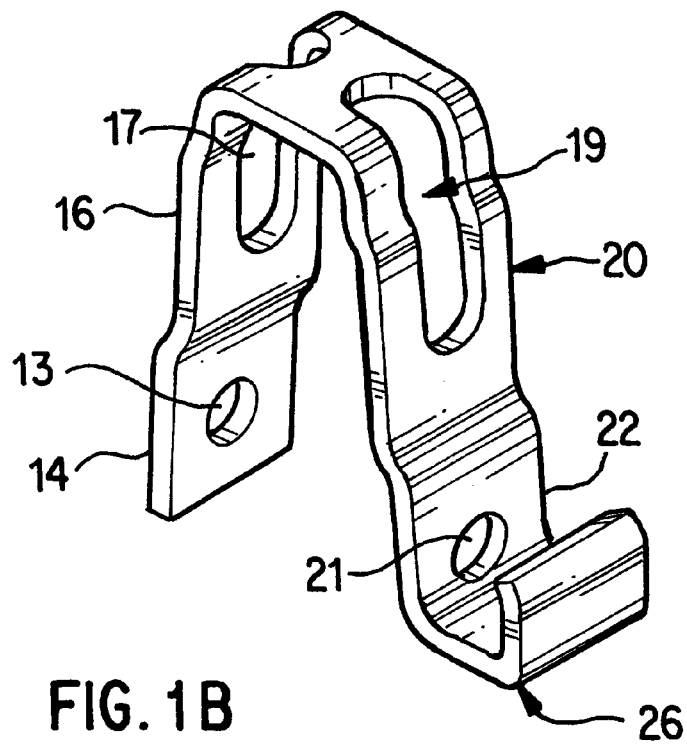
FIG. 1B is a perspective view of the link in accordance with the invention.
Figure 2A:
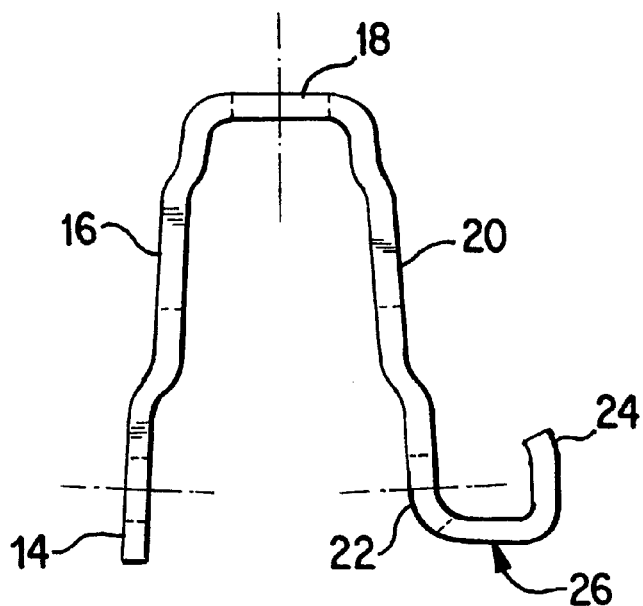
FIG. 2A is a top plan view of the link in accordance with the invention.

With reference to FIGS. 1A–1B, 2A–2C, and 3, a first embodiment of a conveyor belt with a rod and link member connection according to the present invention indicated generally at 10, includes a plurality of link members 12 and transverse rods 30. The general construction of the belt with a plurality of interconnecting pivotal link members 112 and transverse rods 130 forming an overlying belt tier could be as in the conventional belt of FIG. 4, but which further includes the following. Referring to FIG. 2A, the link member is generally U-shaped, with a terminal end 14, a side portion 16, a top portion 18, a second side portion 20, and a second terminal end 26 formed into the shape of a hook. Hook-shaped terminal end 26 includes inner portion 22, outer portion 24 and joining portion 23 extending therebetween.

Figure 2B:
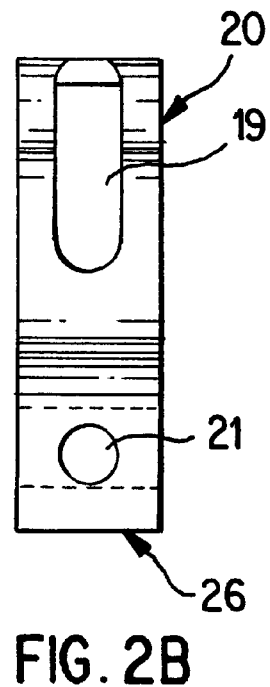
FIG. 2B is a right side elevational view of the link in accordance with the invention.
Figure 2C:
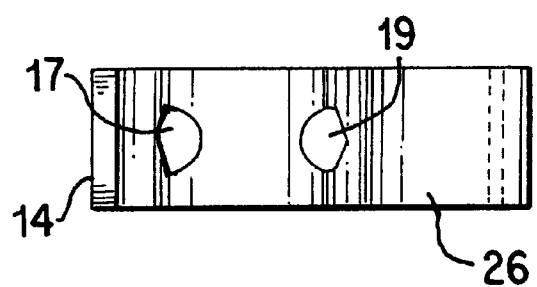
FIG. 2C is a front elevational view of the link in accordance with the invention.

As is seen in FIG. 1B and FIGS. 2B and 2C, a hole 13 is formed through terminal end 14 and a second hole 21 is formed through portion 22 of hook-shaped terminal end 26. Slots 17 and 19 are formed in side portions 16 and 20, respectively.

As is seen in FIG. 1A, according to the present invention, at least one end 31 of the rod 30 is headless. Rod 30 is passed through hole 13 in terminal end 14 and through hole 21 in portion 22 of hook-shaped terminal end 26 so that the headless end 31 of rod 30 abuts against the inner surface of portion 24 of hook-shaped terminal end 26.

Figure 3:
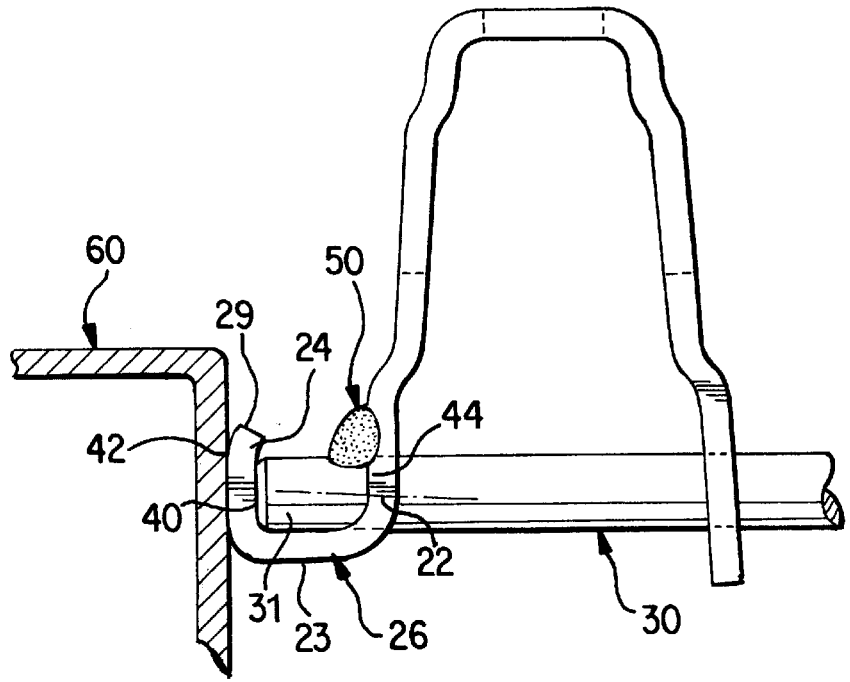
FIG. 3 is a top plan view showing the rod and link connection in accordance with the invention, and showing a portion of a drive mechanism that engages the belt.
Figure 4:
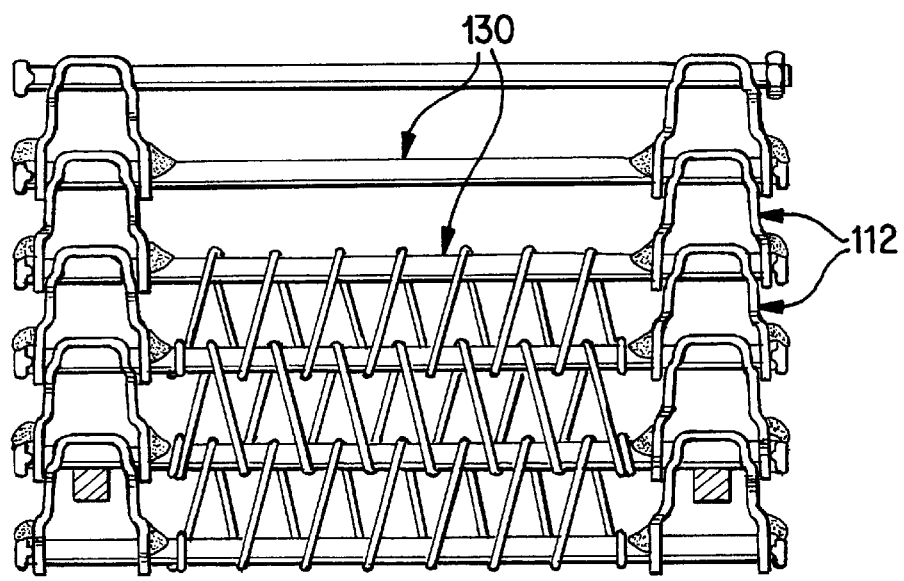
FIG. 4 is a top plan view of a conventional conveyor belt.

Further, referring to FIG. 3, rod 30 is secured within portion 24 of terminal end 26, abutting up against inner surface 40 of portion 24, by, for example, placement of a weld 50 between inner surface 44 of portion 22 of hook-shaped terminal end 26 and end 31 of rod 30. The weld may be of a type of plasma weld. However, this type of weld is exemplary only and it will be appreciated that other welds or means of securing rod 30 within hook-shaped terminal end 26 are contemplated.

Further, outer surface 42 of portion 24 of hook-shaped terminal end 26 may include an end bevel portion 29, in order to present a smooth edge to drive mechanism portion 60. Outer surface 42 of portion 24 frictionally engages drive mechanism portion 60 to provide the drive for the belt. In this way, the belt is frictionally driven by the drive mechanism. In the case of a spiral stacked belt, the driving mechanism portions may be vertical drive bars which can be positioned around the periphery of an upright drum as is shown, e.g., in U.S. Pat. No. 5,350,056.

Figure 5:
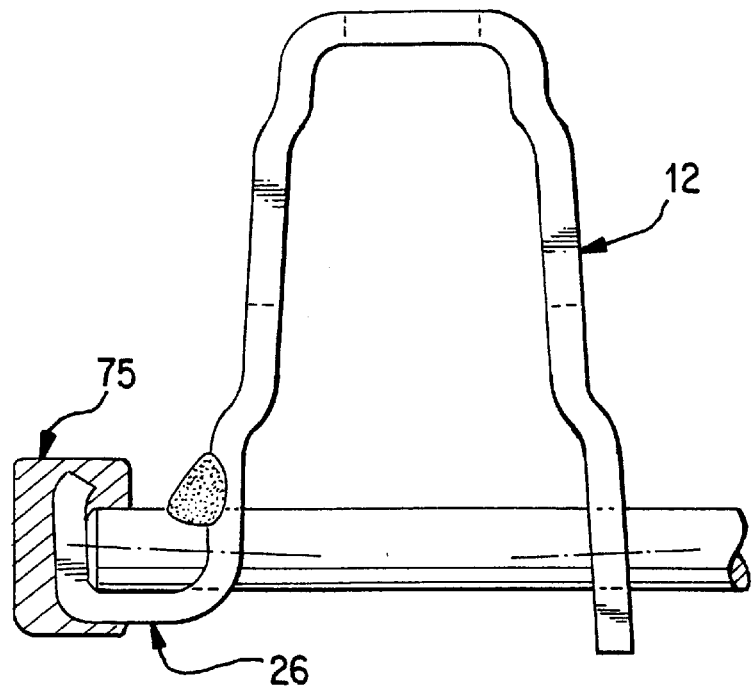
FIG. 5 is a top plan view of a second embodiment of the rod and link connection of the invention showing a cap covering the hook-shaped end of the link.

A second embodiment of the invention is shown in FIG. 5. In this second embodiment a cap 75 (shown in phantom) covers hook shaped terminal end 26 of link 12. Cap 75 preferably is made of material having a higher coefficient of friction than the material of hook-shaped terminal end 26. The material of cap 75 could be an elastomer or other suitable material.

Figure 6:
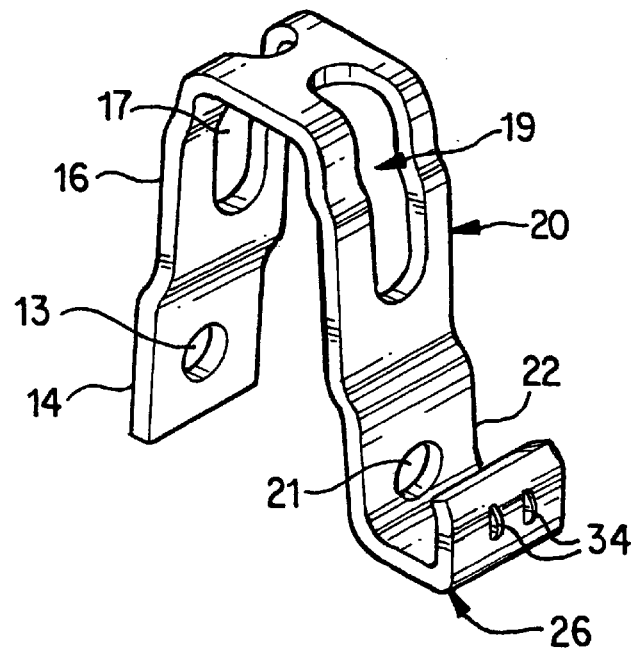
FIG. 6 is a perspective view of a link in accordance with a further embodiment of the invention.

In an additional embodiment, portions of the drive mechanism, such as a vertical drive bar, would contain projecting ribs to engage the protrusion formed by the hook-shaped end of the link. Another variation of the invention, as shown in FIG. 6, would employ ribs 34 projecting from the outer surface of the hook-shaped end of the link to engage the drive mechanism, so as to improve drive friction between the belt edge and the drive mechanism.

Although the invention has been described in connection with certain preferred embodiments, for purposes of a complete disclosure, the invention is not limited thereby, as modifications will be apparent to those skilled in the art.

I claim:

1. A conveyor belt of the type employing a drive mechanism and having opposite side edges, said belt comprising:

a plurality of transverse rods extending between said opposite side edges, each of said transverse rods having a center portion of predetermined diameter and two outermost ends, at least one outermost end of each said transverse rod being defined by said predetermined diameter;

a plurality of links joining adjacent transverse rods, each of said links lying substantially within a single plane and having at least one terminal end being formed into the shape of a hook, said terminal end having an outer portion for engaging said drive mechanism; and wherein said at least one outermost end of said transverse rods abuts an inner surface of the hook-shaped terminal end and is rigidly secured to said links within the hook-shaped terminal end of said links.

2. A conveyor belt as in claim 1 wherein said outer portion of said hook-shaped terminal end has an outer surface which is beveled.

3. A conveyor belt as in claim 1 further comprising a cap member for covering said outer portion.

4. A conveyor belt as in claim 1 wherein said outer surface of said hook-shaped terminal end includes ribs which project from said outer surface so as to engage said drive mechanism.

5. A conveyor belt as in claim 1 wherein an outer surface of said hook-shaped terminal end of said links includes projecting ribs so as to engage a drive mechanism.

6. A conveyor belt as in claim 1 wherein said hook-shaped terminal end of said link includes an inner portion and said inner portion has a hole for admitting said transverse rods.

7. A conveyor belt of the type having at least one side edge capable of collapsing or extending to permit the belt to follow a curved path, said belt comprising:

a plurality of transverse rods, each of said transverse rods having a center portion of predetermined diameter and two outermost ends, at least one outermost end of each said transverse rod being defined by said predetermined diameter;

a plurality of interconnecting links on opposite sides of the belt arranged so as to permit a portion of the length of said belt to assume a curved configuration, each of said links lying substantially within a single plane and having two terminal ends, one of said terminal ends being hook-shaped; and wherein said at least one outermost end of said transverse rods abuts an inner surface of the hook-shaped terminal end and is rigidly secured within said hook-shaped terminal end so as not to protrude beyond said hook-shaped terminal end.

8. A conveyor belt as in claim 7, wherein said terminal ends have holes for admitting said transverse rods.

9. A conveyor belt as in claim 7, wherein said links have side portions having slots for admitting said transverse rods.

10. A conveyor belt as in claim 7, wherein said hook-shaped terminal end has an outer portion and an inner portion, and wherein said inner portion has a hole for admitting said transverse rods and said transverse rods are secured within said outer portion of said hook-shaped terminal end.

11. A conveyor belt as in claim 7, further comprising a cap member for covering said hook-shaped terminal end.

12. A conveyor belt as in claim 7, wherein said hook-shaped terminal end has an inner portion, an outer portion, and a joining portion joining said inner portion to said outer portion.

13. A conveyor belt as in claim 7, wherein said hook-shaped terminal end has an inner portion and an outer portion, said inner portion being spaced from said outer portion.

14. A side link of the type used in a conveyor belt having transverse rods and having a belt length, a portion of the belt length arranged so as to be capable of following a curved path, said side link comprising:

a top portion, two side portions and two terminal ends, lying substantially in a single plane; and wherein one of said terminal ends is hook-shaped and substantially coplanar with said side portions for engaging a transverse rod between an inner portion and an outer portion of said hook-shaped terminal end, said inner portion of said hook-shaped terminal end including a hole for admittance of one of the transverse rods, and said outer portion of said hook-shaped terminal end extending upwardly beyond said hole in said inner portion of said hook-shaped terminal end.

15. A side link as in claim 14, wherein said side portions have slots for admitting a transverse rod.

16. A side link as in claim 14, wherein said hook-shaped terminal end has an outer portion and an inner portion and said inner portion has a slot for admitting a transverse rod.

17. A side link as in claim 14, wherein said hook-shaped terminal end has an outer portion that is beveled.

18. A side link as in claim 14, wherein said hook-shaped terminal end has an outer portion and further comprises a cap member for covering said outer portion.

19. A side link as in claim 14, wherein said hook-shaped terminal end has an inner portion, an outer portion, and a joining portion joining said inner portion to said outer portion.

20. A side link as in claim 14, wherein said hook-shaped terminal end has an inner portion and an outer portion, said inner portion being spaced from said outer portion.

* * * * *